Dec. 25, 1951     H. P. PHILLIPS ET AL     2,579,699
PISTON RING ASSEMBLY AND GROOVE FILLER ELEMENT
FOR USE WITH PISTON RINGS
Filed Sept. 10, 1948

INVENTOR.
Harold P. Phillips
Vergil D. Ackerman
By
Attorney.

Patented Dec. 25, 1951

2,579,699

UNITED STATES PATENT OFFICE 2,579,699

PISTON RING ASSEMBLY AND GROOVE FILLER ELEMENT FOR USE WITH PISTON RINGS

Harold P. Phillips and Virgil D. Ackerman, Hastings, Mich., assignors to Hastings Manufacturing Company, Hastings, Mich.

Application September 10, 1948, Serial No. 48,614

8 Claims. (Cl. 309—45)

This invention relates to improvements in a piston ring assembly and groove filler element for use with piston rings.

The main objects of this invention are:

First, to provide a piston ring assembly adapted for installation in a piston ring groove in which the spring expander element is supported effectively and the assembly functions efficiently in grooves of an excessive depth as compared to standard practice.

Second, to provide such an assembly which is well adapted for use in oil grooves.

Third, to provide a groove filler element which may be economically produced, easily installed and acts to retain itself in position within the groove without interfering with the installation of coacting ring parts or the drainage of the complete assembly.

Objects relating to details and economies of the invention will appear from the description to follow. The invention is pointed out in the claims.

A preferred embodiment of the invention is illustrated in the accompanying drawing, in which.

Figure 1:
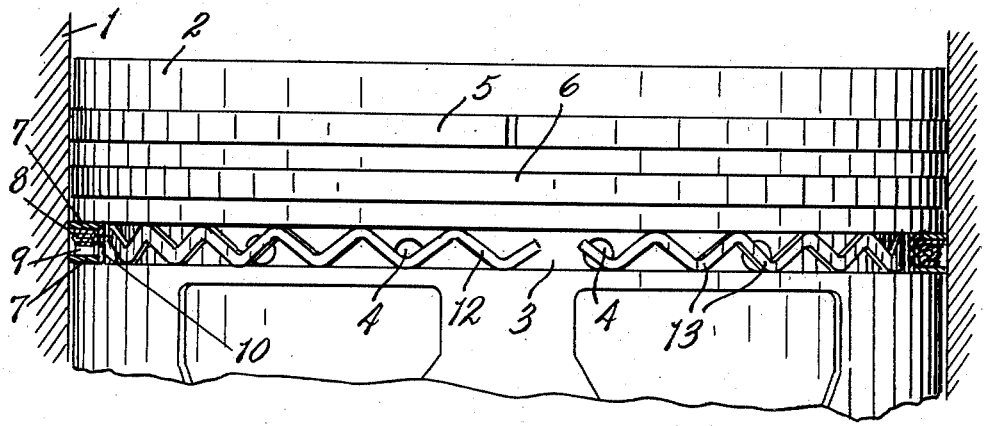
Fig. 1 is a fragmentary view of the piston ring assembly of our invention installed in an oil groove of a piston, the piston and cylinder parts being shown conventionally.
Figure 4:
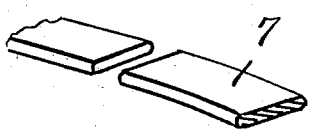
Fig. 4 is a side elevational view of one of the cylinder wall engaging elements.
Figure 5:
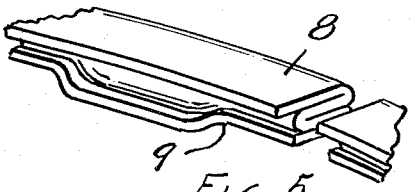
Fig. 5 is a fragmentary perspective view of the spacer element.
Figure 2:
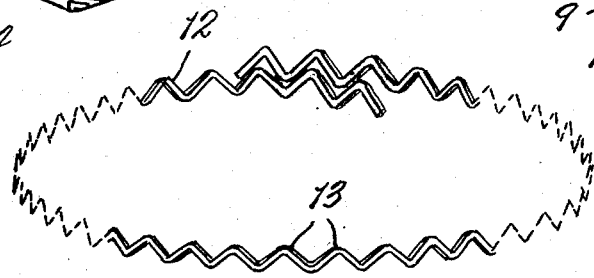
Fig. 2 is a perspective view, partially conventionalized, of the spacer element of our invention.
Figure 3:
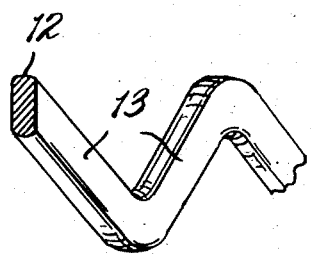
Fig. 3 is an enlarged fragmentary perspective view thereof.
Figure 6:
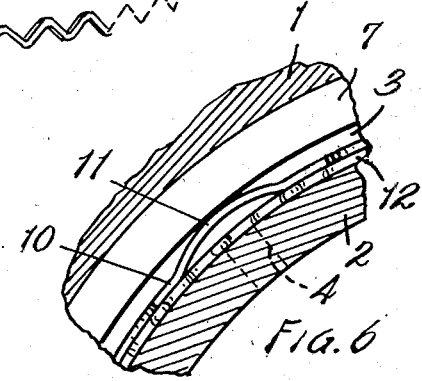
Fig. 6 is an enlarged fragmentary section showing the relationship of the expander and the filler element and associated parts.

In the accompanying drawing 1 represents a cylinder 2, a piston having three piston ring grooves therein, the groove 3 being the oil groove and being provided with drainage openings 4. Piston rings 5 and 6 are conventionally shown in the upper and intermediate grooves. They form no part of our present invention.

The piston ring assembly embodying our invention as illustrated comprises thin, annular split cylinder wall engaging elements 7 disposed in supported engagement with the side walls of the groove 3. The spacer 8 is provided with drain openings 9. We have not in the accompanying drawing attempted to show clearances or tolerances. It will be understood that they are such that the cylinder wall and contacting elements can move freely within the groove.

The expander spring 10 is provided with circumferentially spaced crimps 11. This expander spring is in engagement with the cylinder contacting members 7 but is preferably not in engagement with the spacer. In order to be effective the expander must be supported so as to exert the desired radial thrust on the cylinder wall engaging elements. Sometimes the depth of the groove is such that when the expander is seated on the bottom of the groove, as is customary, the unit pressure falls below that desired. Where excessively deep grooves are encountered we employ what we designate as a filler element, designated generally by the numeral 12. This is seated on the bottom of the piston ring groove and serves as a support for the expander.

The filler element 12 is formed of wire, preferably of flattened section and with corrugations 13 formed edgewise of the stock and axially of the filler. The filler is resiliently springable and is in its relaxed condition of a less diameter than the diameter of the bottom of the groove so that when the filler element is expanded and inserted in the groove it contractingly engages the bottom of the groove.

The corrugations 13 are desirably of such height that the crowns of the filler are in expansible springable engagement with the side walls of the groove. This effectively retains the filler in position on the bottom of the groove and so that it does not shift or move about when the piston is in operation. The flat surfaces present an effective support for the expander spring and minimizes the wear thereon. It will be understood that there is some movement of the expander spring as it functions to maintain the cylinder wall engaging elements under tension as the piston travels or reciprocates in a cylinder that is worn into a somewhat tapering condition.

The filler element of our invention may be very economically produced. It is easily installed and does not interfere with the drainage when installed in an oil groove.

We have not attempted to illustrate or describe various modifications and adaptations which we contemplate as it is believed this disclosure will enable those skilled in the art to embody or adapt our invention as may be desired.

Having thus described our invention, what we claim as new and desire to secure by Letters Patent is:

1. A piston ring assembly adapted for installation in a piston ring groove having drain openings at the bottom thereof, comprising a pair of thin split flat annular cylinder wall engaging elements, a spacer provided with drain openings between said cylinder wall engaging elements, an expander having a plurality of crimps therein coacting with said cylinder wall engaging members, said expander having drain openings therein, and an annular split springable filler element for supporting said expander, said filler element being formed of resilient wire of flattened section and edgewise corrugated axially of the element to be positioned with the inner flattened side engaging the bottom wall of the piston ring groove with the filler element in resiliently contractable engagement with the bottom of the groove and the crowns of corrugations thereof in springable frictional engagement with the side walls of the groove.

2. A piston ring assembly adapted for installation in a piston ring groove having drain openings at the bottom thereof, comprising a pair of thin split flat annular cylinder wall engaging elements, a spacer provided with drain openings between said cylinder wall engaging elements, an expander having a plurality of crimps therein coacting with said cylinder wall engaging members, said expander having drain openings therein, and an annular split springable filler element for supporting said expander, said filler element being formed of resilient wire corrugated axially of the element to be retainingly engaged against the bottom wall of the piston ring groove.

3. In combination with a piston ring assembly, including a pair of split annular expansible cylinder wall engaging elements, a spacer disposed therebetween, and a spring expander having a plurality of spaced crimps, of an annular split springable groove filler element for positioning in a piston ring groove at the inner side of the expander and in supporting relation thereto, the filler element comprising a resilient strand axially corrugated for contracting springable engagement with the bottom wall of the groove and expansible springable engagement with the side walls of the groove.

4. In combination with a piston ring assembly, including a pair of split annular expansible cylinder wall engaging elements, a spacer disposed therebetween, and a spring expander having a plurality of spaced crimps, of an annular split springable groove filler element for positioning in a piston ring groove at the inner side of the expander and in supporting relation thereto, the filler element comprising a resilient strand axially corrugated for springable engagement with the bottom wall of the groove when supported on the bottom thereof.

5. An annular split springably contractable filler element for piston ring grooves consisting of a single strand of sinuously bent wire for springable contracting engagement with the bottom wall of a groove having a diameter exceeding that of the diameter of the filler element when it is relaxed, the bends being adapted for springable engagement with the side walls of a groove of less width than the axial width of the filler element.

6. An annular split springably contractable filler element for piston ring grooves consisting of a single strand of sinuously bent wire for springable contracting engagement with the bottom wall of a groove having a diameter exceeding that of the diameter of the filler element when it is relaxed.

7. An annular split filler element for piston ring grooves consisting of a single strand of wire of flat section corrugated edgewise axially of the filler element, the inner flat side of the filler element constituting means for engaging the bottom wall of a piston ring groove and the outer flat side constituting means for engaging an expander.

8. An annular split filler element for piston ring grooves consisting of a single strand of wire corrugated axially of the element, the inner radial wall of the filler element constituting means for engaging the bottom wall of a ring groove, and the outer radial wall constituting means for engaging the inner radial wall of an expander element.

HAROLD P. PHILLIPS.
VIRGIL D. ACKERMAN.

REFERENCES CITED

The following references are of record in the file of this patent:

UNITED STATES PATENTS

| Number | Name | Date |
| --- | --- | --- |
| 1,844,214 | Deutsch | Feb. 9, 1932 |
| 2,293,450 | Wilkening | Aug. 18, 1942 |
| 2,404,862 | Phillips | July 30, 1946 |